Patented Dec. 11, 1951

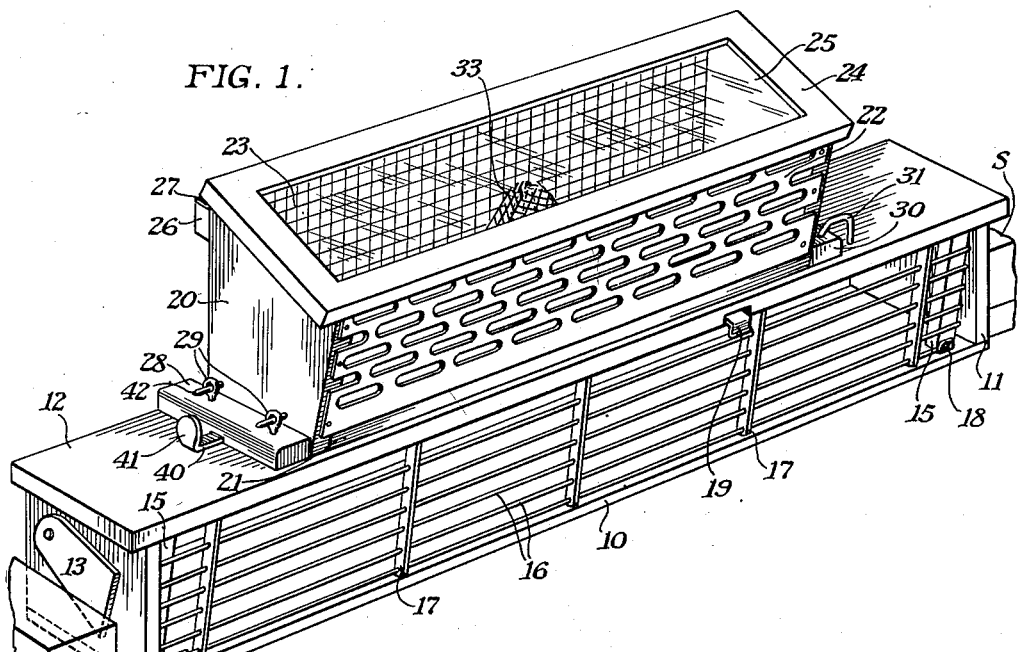
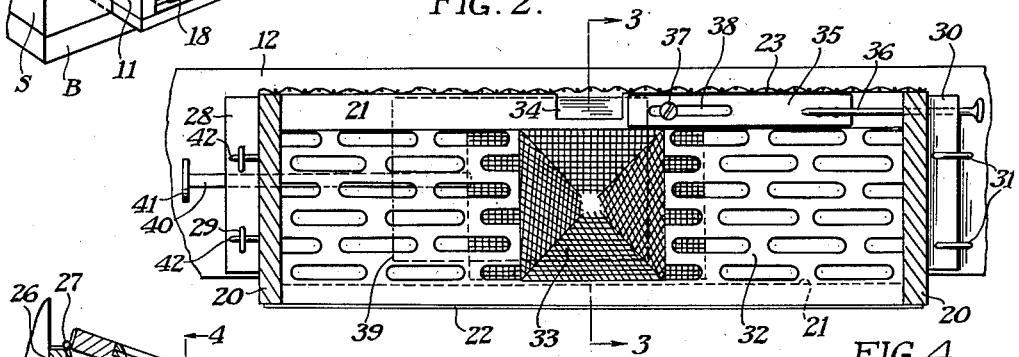
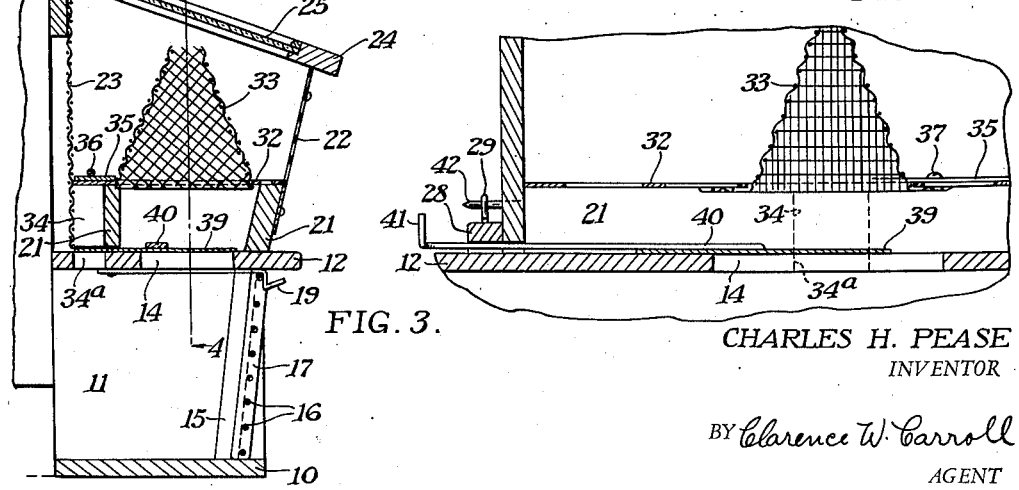

2,578,634

UNITED STATES PATENT OFFICE 2,578,634

QUEEN AND DRONE TRAP

Charles H. Pease, Canaan, Conn., assignor of one-fourth to Clarence W. Carroll, Rochester, N. Y.

Application October 29, 1949, Serial No. 124,368

2 Claims. (Cl. 6—7)

This invention relates to queen and drone traps, and more particularly to a device which apiarists may readily install at a beehive entrance, and which will prevent drones or queen bees from escaping, and at the same time will permit the user to see what the trap has caught without taking it apart. After such visual inspection the trap may be partially disassembled to remove the drones or a queen, by a very simple and rapid manual manipulation. Other objects will appear in the course of this specification, the presumed novel and distinguishing features being set forth in their broadest aspects in the claims appended hereto. A full and complete understanding of the invention may be had by apiarists and others skilled in bee-colony management by referring to the drawings accompanying this description, wherein Fig. 1 is a perspective view of my complete trap as it appears when installed at the entrance of a standard beehive, the adjacent portions of the hive being shown in fragmentary form;

Fig. 2 is a top plan with the cover removed;

Fig. 3 is a transverse sectional elevation taken across line 3—3 in Fig. 2; and

Fig. 4 is a fragmentary longitudinal section approximately on line 4—4 of Fig. 3.

It is common practice among experts in bee-colony management to eliminate drones as promptly and completely as possible because, as is well known, they consume a great deal of honey and produce none, thus being a definite liability and loss, except for a few that may succeed in mating with queens from their own or neighboring colonies. Also, it is desirable, when swarming is imminent, to prevent a queen bee from departing with a swarm, for many reasons, not necessary to relate here in detail.

My improved trap is designed to avoid the difficulties inherent in others which have been tried, and one of the further objects previously mentioned has been accomplished by providing a removable upper chamber, or, as it will be hereinafter referred to, a glass-topped "cupola."

Referring first to Fig. 1, it will be apparent that the trap comprises a lower chamber and an upper chamber. The lower chamber has a bottom 10, solid sides 11, and a flat top 12. Pivoted cleats 13 or similar movable pieces, may be located on each side, to jam between the sides 11 and the edge bars S of a hive bottom board B, so that the trap will be retained close against the front of a hive. This lower chamber is open at the rear, or toward the hive entrance, but the front is filled by a grill composed of horizontal bars 16, accurately spaced by ribs 17 to dimensions which allow passage of worker bees but do not permit drones or queens to pass. This barred construction, commonly called "excluder grating" is well known and commercially available. Stops 18 and one or more snap spring clips 19 serve to hold the grating removably in place against cleats 15 fixed to the sides 11. The upper chamber and the lower chamber therefore are each of box-like form.

The "cupola" has side pieces 20, a footpiece 21, and a cover 24 which has a pane of glass or transparent material 25 occupying the greater part of its area. The cover is hinged at 27 to a rear cleat 26. The back of the cupola is not open, as is the lower chamber, but may be closed by a screen 23 or other suitable closure that will stop all bees. The front may be covered with a grating similar to 16—17, but for economy in construction, a piece 22 of a commercial material known as "excluder zinc" is used, which may be purchased in sheets and cut to a required size. The zinc serves the same purpose as the grating 16, that is, it permits the passage of worker bees but confines drones or queens. A cleat 28 fixed to the top 12 carries loops or screweyes 29 into which prongs 42 on one of the sides 20 may enter. A cleat 30 is attached to the opposite side 20 so that when one or more hooks or turnbuttons 31 are placed as shown in Fig. 2, the cupola will be firmly retained in place on the top 12 of the lower chamber, but may be very quickly lifted off when the hooks 31 are given a quarter-turn toward the front or rear.

Within the cupola are longitudinal cleats 21 across the top of which is fastened another sheet of excluder zinc 32. An opening in the center of the sheet 32 is filled with an escape cone 33 of screen wire, its open top permitting drones to escape into the cupola. Worker bees and queens also may do the same, and few of them ever return through the cone, which is, in effect, a "one-way street." Such cones have long been known and used in a similar manner. Worker bees, of course, can freely emerge from the trap through the excluder 22.

If a user wishes to remove the trapped drones, he closes the opening 14 by moving a slideable valve or shutter 39 that lies on the upper face of the top piece 12, and under the rear cleat 21. This plate is moved by means of a protruding fingerpiece 41 on the end of a bar 40 which is suitably fixed to the shutter 39. The operator then turns hooks 31 and pulls the cupola to the right, lifting it up to free it from the eyes 29. The drones may be destroyed by any means the operator chooses to employ, and may be removed by merely lifting cover 24 and inverting the cupola.

If the apiarist discovers that a new queen is in the cupola, he will assume that she has superseded the old queen and has tried to go out to mate with a drone, which a "virgin" queen will not do in the hive. In such circumstances, the new queen may be permitted to return to the hive by pulling to the right a rod or bar 36, which moves a smaller slide 35 away from a slot 34, thus providing a return passage through it and a second slot 34a in the top piece 12, if the slide 39 is also open. A new queen will almost always return to the hive, and when the trap is removed, will fly out to mate a day or so later. The slide 35 is normally pushed in to keep slot 34 covered, so that drones cannot return to the hive.

If the queen in the cupola is reluctant in returning to the hive, the operator may remove the cupola as previously described, also the grating 16—17, and then, after opening the cover 24, hold the cupola tipped over with the cover toward the hive, and the queen will usually walk over the cover and through the lower compartment of the trap into the hive entrance.

The transparent top 25 affords an apiarist a means of quickly ascertaining the condition of a colony. An experienced operator may see at a glance whether a swarm has issued, or is likely soon to issue, or whether a queen has been superseded. It is quite possible to thus inspect all the hives in an apiary in only a fraction of the time required with traps heretofore used.

The trap as illustrated herewith is made principally of wood, but could be plastic material or entirely of sheet metal. Some modifications have been proposed and tried, and it is intended that the invention shall be construed in its scope and entirety as defined in the following claims.

I claim:

1. A queen and drone trap adapted to cover the entrance of a beehive, comprising, in combination, a lower compartment open toward the hive and having a drone-confining front wall and an opening in its top wall; an upper compartment having a transparent cover and a drone-confining front wall and detachably mounted on the lower compartment; a drone-confining partition in the upper compartment and spaced from the lower edges of the latter, said partition having a bee-escape cone or equivalent to permit passage of both drones, queens and worker bees into the upper compartment; a spacer between the upper and lower compartments provided with a return port; and independently movable closures for the return port and for the opening aforesaid.

2. A queen and drone trap adapted to cover the entrance of a beehive and having a lower box-like member open toward said entrance and having a top wall with an opening therein; an upper box-like member detachably mounted on said top wall and provided with a transparent cover, both of said members having drone-confining front walls; a drone-confining partition above the lower edges of the upper member and an upwardly-directed bee escape through said partition; a spacer below the partition having an opening communicating with the upper member; a closure for said opening; and a separate closure for the opening in the top wall of the lower member, said last-mentioned closure also being arranged to close the return port.

CHARLES H. PEASE.

REFERENCES CITED

The following references are of record in the file of this patent:

UNITED STATES PATENTS

| Number | Name | Date |
|---|---|---|
| 593,712 | Williams | Nov. 16, 1897 |
| 1,462,933 | Cottam | July 24, 1923 |